US008953567B2

(12) United States Patent
Annamalai (10) Patent No.: US 8,953,567 B2
(45) Date of Patent: Feb. 10, 2015

(54) SYSTEM AND METHOD FOR UTILIZING IP-BASED WIRELESS TELECOMMUNICATIONS CLIENT LOCATION DATA (75) Inventor: Magesh Annamalai, Renton, WA (US)

(73) Assignee: T—Mobile USA, Inc., Bellevue, WA (US)

( * ) Notice: Subject to any disclaimer, the term of this patent is extended or adjusted under 35 U.S.C. 154(b) by 1667 days.

(21) Appl. No.: 12/446,454

(22) PCT Filed: Oct. 22, 2007

(86) PCT No.: PCT/US2007/082136
§ 371 (c)(1),
(2), (4) Date: Jan. 10, 2011

(87) PCT Pub. No.: WO2008/051929
PCT Pub. Date: May 2, 2008

(65) Prior Publication Data
US 2011/0200022 A1    Aug. 18, 2011

Related U.S. Application Data (60) Provisional application No. 60/853,086, filed on Oct. 20, 2006.

(51) Int. Cl.
*H04L 12/28* (2006.01)
*H04W 8/08* (2009.01)
(Continued)

(52) U.S. Cl.
CPC ............... *H04W 8/04* (2013.01); *H04W 84/12* (2013.01); *H04W 8/10* (2013.01)
USPC ........... 370/338; 370/446; 709/202; 709/217; 709/220; 709/230; 709/245; 455/404.2; 455/414.2; 455/456.1; 455/456.2

(58) Field of Classification Search
CPC ......... H04W 8/04; H04W 8/10; H04W 16/16; H04W 88/06; H04W 64/00; H04W 64/003; H04W 12/08; H04W 60/04; H04W 76/06; H04W 8/08; H04W 4/02; H04W 4/22; H04W 76/007; H04L 12/58; H04L 51/36; H04L 12/589; H04L 12/66; H04L 63/102; H04M 1/02; H04M 1/2473; H04M 1/2478; H04M 1/2535; H04M 1/72527; H04M 3/567; H04N 7/147
USPC ................................. 370/228–463
See application file for complete search history.

(56) References Cited

U.S. PATENT DOCUMENTS

| 5,724,660 | A | 3/1998 | Kauser et al. |
| 6,002,679 | A | 12/1999 | Liu et al. |

(Continued)

FOREIGN PATENT DOCUMENTS

| EP | 1583374 | 10/2005 |
| EP | 2051556 A1 | 4/2009 |

(Continued)

OTHER PUBLICATIONS

"Enabler Release Definition for Secure UserPlane for Location," Candidate Version 1.0, Open Mobile Alliance, Jan. 22, 2007, 17 pages.

(Continued)

*Primary Examiner* — Venkatesh Haliyur
(74) *Attorney, Agent, or Firm* — Perkins Coie LLP (57) ABSTRACT A location provision facility communicates with a mobile telecommunications device over an IP-based telecommunications network to obtain information that enables the facility to determine a location of the telecommunications device. The facility and/or the telecommunications device store the determined location. In response to requests from location-based applications for the location of the telecommunications device, the facility can provide the location-based applications with the stored or calculated location.

25 Claims, 7 Drawing Sheets

(51) Int. Cl.
*H04W 4/02* (2009.01)
*H04W 8/04* (2009.01)
*H04W 8/10* (2009.01)
*H04W 84/12* (2009.01)

(56) References Cited

U.S. PATENT DOCUMENTS

| | | | |
|---|---|---|---|
| 6,104,712 A | 8/2000 | Robert et al. | |
| 6,119,012 A | 9/2000 | Amirijoo | |
| 6,222,483 B1 | 4/2001 | Twitchell et al. | |
| 6,249,252 B1 | 6/2001 | Dupray | |
| 6,252,545 B1 | 6/2001 | Da et al. | |
| 6,463,288 B1 | 10/2002 | Havinis et al. | |
| 6,603,976 B1 | 8/2003 | Amirijoo et al. | |
| 6,603,978 B1 | 8/2003 | Carlsson et al. | |
| 6,665,611 B1 | 12/2003 | Oran et al. | |
| 6,671,514 B1 | 12/2003 | Cedervall et al. | |
| 6,690,659 B1 | 2/2004 | Ahmed et al. | |
| 6,711,417 B1* | 3/2004 | Gorman et al. | 455/550.1 |
| 6,801,778 B2 | 10/2004 | Koorapaty et al. | |
| 7,151,941 B2 | 12/2006 | Vanttinen et al. | |
| 7,158,500 B2* | 1/2007 | Annamalai | 370/338 |
| 7,177,399 B2 | 2/2007 | Dawson et al. | |
| 7,187,923 B2* | 3/2007 | Mousseau et al. | 455/416 |
| 7,194,354 B1 | 3/2007 | Oran et al. | |
| 7,245,900 B1 | 7/2007 | Lamb et al. | |
| 7,272,500 B1 | 9/2007 | Walker | |
| 7,283,822 B2* | 10/2007 | Gallagher et al. | 455/436 |
| 7,304,985 B2* | 12/2007 | Sojka et al. | 370/352 |
| 7,313,143 B1 | 12/2007 | Bruno | |
| 7,317,910 B2 | 1/2008 | Niemenmaa et al. | |
| 7,336,668 B2* | 2/2008 | Adams | 370/396 |
| 7,336,962 B2 | 2/2008 | Levitan | |
| 7,353,034 B2 | 4/2008 | Haney | |
| 7,369,859 B2* | 5/2008 | Gallagher | 455/456.1 |
| 7,433,673 B1 | 10/2008 | Everson et al. | |
| 7,436,789 B2 | 10/2008 | Caliskan et al. | |
| 7,466,986 B2 | 12/2008 | Halcrow et al. | |
| 7,577,431 B2* | 8/2009 | Jiang | 455/432.1 |
| 7,593,605 B2 | 9/2009 | King et al. | |
| 7,606,555 B2 | 10/2009 | Walsh et al. | |
| 7,610,011 B2 | 10/2009 | Albrett | |
| 7,613,155 B2* | 11/2009 | Shim | 370/338 |
| 7,620,404 B2* | 11/2009 | Chesnais et al. | 455/456.1 |
| 7,640,008 B2* | 12/2009 | Gallagher et al. | 455/414.1 |
| 7,653,394 B2 | 1/2010 | McMillin | |
| 7,664,494 B2* | 2/2010 | Jiang | 455/432.1 |
| 7,676,394 B2 | 3/2010 | Ramer et al. | |
| 7,688,261 B2 | 3/2010 | DiEsposti | |
| 7,714,778 B2 | 5/2010 | Dupray | |
| 7,768,963 B2 | 8/2010 | Alizadeh-Shabdiz | |
| 7,856,315 B2 | 12/2010 | Sheha et al. | |
| 7,903,029 B2 | 3/2011 | Dupray | |
| 7,904,096 B2 | 3/2011 | Shyr et al. | |
| 7,949,326 B2* | 5/2011 | Gallagher et al. | 455/404.2 |
| 7,974,639 B2* | 7/2011 | Burroughs et al. | 455/456.2 |
| 8,116,291 B2 | 2/2012 | Annamalai et al. | |
| 8,145,183 B2 | 3/2012 | Barbeau et al. | |
| 8,213,957 B2 | 7/2012 | Bull et al. | |
| 8,364,746 B2* | 1/2013 | Annamalai et al. | 709/202 |
| 8,369,266 B2 | 2/2013 | Jin et al. | |
| 8,509,731 B2 | 8/2013 | Kholaif et al. | |
| 8,571,043 B2* | 10/2013 | Horner | 370/401 |
| 2002/0064141 A1 | 5/2002 | Sakakura | |
| 2002/0077144 A1 | 6/2002 | Keller et al. | |
| 2002/0123354 A1 | 9/2002 | Nowak | |
| 2003/0009385 A1 | 1/2003 | Tucciarone et al. | |
| 2003/0016648 A1 | 1/2003 | Lindsay et al. | |
| 2003/0032404 A1 | 2/2003 | Wager et al. | |
| 2003/0058844 A1* | 3/2003 | Sojka et al. | 370/352 |
| 2003/0095069 A1 | 5/2003 | Stilp | |
| 2003/0139182 A1 | 7/2003 | Bakkeby et al. | |
| 2003/0216143 A1 | 11/2003 | Roese et al. | |
| 2003/0222819 A1 | 12/2003 | Karr et al. | |
| 2004/0062264 A1* | 4/2004 | Adams | 370/432 |
| 2004/0076157 A1* | 4/2004 | Sojka et al. | 370/389 |
| 2004/0087315 A1 | 5/2004 | Dufva et al. | |
| 2004/0102196 A1 | 5/2004 | Weckstrom et al. | |
| 2004/0114577 A1* | 6/2004 | Sojka et al. | 370/352 |
| 2004/0122730 A1 | 6/2004 | Tucciarone et al. | |
| 2004/0142704 A1 | 7/2004 | Scholz | |
| 2004/0157590 A1 | 8/2004 | Lazaridis et al. | |
| 2004/0162896 A1 | 8/2004 | Cen et al. | |
| 2004/0166856 A1 | 8/2004 | Niemenmaa | |
| 2004/0198386 A1 | 10/2004 | Dupray | |
| 2004/0202120 A1 | 10/2004 | Hanson | |
| 2004/0202194 A1* | 10/2004 | Annamalai | 370/446 |
| 2004/0203853 A1 | 10/2004 | Sheynblat | |
| 2004/0203915 A1 | 10/2004 | van Diggelen et al. | |
| 2004/0224702 A1 | 11/2004 | Chaskar | |
| 2004/0240430 A1* | 12/2004 | Lin et al. | 370/352 |
| 2005/0003831 A1 | 1/2005 | Anderson | |
| 2005/0059415 A1 | 3/2005 | Easo et al. | |
| 2005/0066044 A1 | 3/2005 | Chaskar et al. | |
| 2005/0070306 A1 | 3/2005 | Kim et al. | |
| 2005/0075116 A1* | 4/2005 | Laird et al. | 455/456.3 |
| 2005/0079821 A1 | 4/2005 | Bi | |
| 2005/0130673 A1* | 6/2005 | Annamalai | 455/456.2 |
| 2005/0136943 A1 | 6/2005 | Banerjee et al. | |
| 2005/0138144 A1 | 6/2005 | Sethi | |
| 2005/0148342 A1 | 7/2005 | Sylvain | |
| 2005/0153687 A1 | 7/2005 | Niemenmaa et al. | |
| 2005/0159153 A1* | 7/2005 | Mousseau et al. | 455/432.1 |
| 2005/0170851 A1 | 8/2005 | Melpignano et al. | |
| 2005/0181805 A1* | 8/2005 | Gallagher | 455/456.1 |
| 2005/0186948 A1* | 8/2005 | Gallagher et al. | 455/414.1 |
| 2005/0192024 A1 | 9/2005 | Sheynblat | |
| 2005/0286466 A1 | 12/2005 | Tagg et al. | |
| 2006/0009235 A1 | 1/2006 | Sheynblat et al. | |
| 2006/0014517 A1 | 1/2006 | Barclay et al. | |
| 2006/0014548 A1 | 1/2006 | Bolin et al. | |
| 2006/0015513 A1 | 1/2006 | Poyhonen et al. | |
| 2006/0025158 A1 | 2/2006 | Leblanc et al. | |
| 2006/0029296 A1 | 2/2006 | King et al. | |
| 2006/0052115 A1 | 3/2006 | Khushu | |
| 2006/0062363 A1 | 3/2006 | Albrett | |
| 2006/0098899 A1 | 5/2006 | King et al. | |
| 2006/0172732 A1 | 8/2006 | Nylander et al. | |
| 2006/0178146 A1 | 8/2006 | Lee et al. | |
| 2006/0194594 A1 | 8/2006 | Ruutu et al. | |
| 2006/0212217 A1 | 9/2006 | Sheha et al. | |
| 2006/0245406 A1* | 11/2006 | Shim | 370/338 |
| 2006/0258365 A1 | 11/2006 | Cha et al. | |
| 2006/0258369 A1* | 11/2006 | Burroughs et al. | 455/456.1 |
| 2006/0276201 A1 | 12/2006 | Dupray | |
| 2006/0286984 A1 | 12/2006 | Bonner | |
| 2006/0293066 A1* | 12/2006 | Edge et al. | 455/456.3 |
| 2007/0032249 A1* | 2/2007 | Krishnamurthi et al. | 455/456.1 |
| 2007/0060097 A1* | 3/2007 | Edge et al. | 455/404.1 |
| 2007/0060114 A1 | 3/2007 | Ramer et al. | |
| 2007/0061198 A1 | 3/2007 | Ramer et al. | |
| 2007/0061242 A1 | 3/2007 | Ramer et al. | |
| 2007/0061243 A1 | 3/2007 | Ramer et al. | |
| 2007/0061244 A1 | 3/2007 | Ramer et al. | |
| 2007/0061245 A1 | 3/2007 | Ramer et al. | |
| 2007/0061246 A1 | 3/2007 | Ramer et al. | |
| 2007/0061247 A1 | 3/2007 | Ramer et al. | |
| 2007/0061303 A1 | 3/2007 | Ramer et al. | |
| 2007/0061317 A1 | 3/2007 | Ramer et al. | |
| 2007/0072624 A1 | 3/2007 | Niemenmaa et al. | |
| 2007/0073717 A1 | 3/2007 | Ramer et al. | |
| 2007/0073718 A1 | 3/2007 | Ramer et al. | |
| 2007/0073719 A1 | 3/2007 | Ramer et al. | |
| 2007/0073722 A1 | 3/2007 | Ramer et al. | |
| 2007/0073723 A1 | 3/2007 | Ramer et al. | |
| 2007/0123237 A1 | 5/2007 | Cacioppo et al. | |
| 2007/0155489 A1 | 7/2007 | Beckley et al. | |
| 2007/0167174 A1 | 7/2007 | Halcrow et al. | |
| 2007/0178913 A1 | 8/2007 | Niemenmaa et al. | |
| 2007/0189497 A1 | 8/2007 | Bareis | |
| 2007/0192294 A1 | 8/2007 | Ramer et al. | |
| 2007/0192318 A1 | 8/2007 | Ramer et al. | |
| 2007/0198485 A1 | 8/2007 | Ramer et al. | |
| 2007/0217454 A1* | 9/2007 | Horner | 370/522 |

(56) References Cited

U.S. PATENT DOCUMENTS

| | | | |
|---|---|---|---|
| 2007/0239724 | A1 | 10/2007 | Ramer et al. |
| 2007/0288427 | A1 | 12/2007 | Ramer et al. |
| 2008/0009268 | A1 | 1/2008 | Ramer et al. |
| 2008/0014956 | A1 | 1/2008 | Balasubramanian |
| 2008/0045236 | A1 | 2/2008 | Nahon et al. |
| 2008/0076420 | A1 | 3/2008 | Khetawat et al. |
| 2008/0076429 | A1 | 3/2008 | Comstock et al. |
| 2008/0081620 | A1 | 4/2008 | Lu et al. |
| 2008/0096594 | A1 | 4/2008 | Vinding |
| 2008/0108319 | A1 | 5/2008 | Gallagher |
| 2008/0146245 | A1 | 6/2008 | Appaji |
| 2008/0192696 | A1 | 8/2008 | Sachs et al. |
| 2008/0280624 | A1 | 11/2008 | Wrappe |
| 2009/0054070 | A1* | 2/2009 | Gallagher et al. ............ 455/445 |
| 2009/0171583 | A1 | 7/2009 | DiEsposti |
| 2009/0177730 | A1* | 7/2009 | Annamalai et al. ........... 709/202 |
| 2009/0185669 | A1 | 7/2009 | Zitnik et al. |
| 2009/0275348 | A1 | 11/2009 | Weinreich et al. |
| 2009/0311987 | A1 | 12/2009 | Edge et al. |
| 2010/0046406 | A1 | 2/2010 | Annamalai et al. |
| 2010/0069099 | A1 | 3/2010 | Dunn et al. |
| 2010/0150120 | A1 | 6/2010 | Schlicht et al. |
| 2010/0289640 | A1 | 11/2010 | Annamalai |
| 2010/0291947 | A1 | 11/2010 | Annamalai |
| 2010/0331017 | A1 | 12/2010 | Ariga |
| 2011/0039576 | A1 | 2/2011 | Prakash et al. |
| 2011/0047033 | A1 | 2/2011 | Mahaffey et al. |
| 2011/0051658 | A1 | 3/2011 | Annamalai et al. |
| 2011/0051665 | A1 | 3/2011 | Huang |
| 2011/0111726 | A1 | 5/2011 | Kholaif et al. |
| 2011/0159886 | A1 | 6/2011 | Kangas et al. |
| 2011/0200022 | A1* | 8/2011 | Annamalai .................. 370/338 |
| 2012/0096490 | A1 | 4/2012 | Barnes, Jr. et al. |
| 2012/0116677 | A1 | 5/2012 | Higgison et al. |
| 2012/0320888 | A1 | 12/2012 | Annamalai et al. |
| 2013/0150085 | A1 | 6/2013 | Jin et al. |

FOREIGN PATENT DOCUMENTS

| | | |
|---|---|---|
| JP | 10239416 | 9/1998 |
| WO | WO-0027143 | 5/2000 |
| WO | WO-2005004528 | 1/2005 |
| WO | WO-2005060292 | 6/2005 |

OTHER PUBLICATIONS

"Google Search of Location of Mobile," http://www.google.com/search?q=location+of+mibile&sourceid=ie7&rls=com.microsoft:en-us:IE-SearchBox&ie=&oe= [Last Accessed Jun. 8, 2010], 2 pages.

"IP Multimedia Subsystem," Wikipedia, http://wikipedia.org/wiki/IP_Multimedia_Subsystem, 13 pages [Last Accessed May 5, 2010].

"Secure User Plane for Location Requirements," Candidate Version 1.0, Open Mobile Alliance, Jun. 16, 2005, 26 pages.

"Secure UserPlane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence—Dual Mode Handsets," UMA Universal Mobile Access, UMA Today, 2007, 2 pages.

"The 3GPP Standard for Convergence—Femtocells," UMA Universal Mobile Access, UMA Today, 2007, 2 pages.

"The 3GPP Standard for Convergence—Softmobiles," UMA Universal Mobile Access, UMA Today, 2007, 2 pages.

"The 3GPP Standard for Convergence—Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Annamalai, Magesh, "Method and Delivery of UMA Value Added Location Services Via SUPL," U.S. Appl. No. 60/853,086, filed Oct. 20, 2006, 15 pages.

Dyoub, J. et al., "Dueling Architectures: Control plane vs. Userplane," HP invent, 2004, 2 pages.

Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Application No. PCT/US2007/82133, Applicant: T-Mobile USA, Inc., Flied on Oct. 22, 2007, Date Mailed on Apr. 29, 2008, 9 pages.

International Search Report and Written Opinion, International Application No. PCT/2006/41226, Filed on Oct. 20, 2006, Applicant: T-Mobile USA, Inc., Date of Mailing: Dec. 4, 2007, 18 pages.

International Search Report and Written Opinion, International Application No. PCT/2007/82156, Filed on Oct. 22, 2007, Applicant: T-Mobile USA, Inc., Date of Mailing: May 28, 2008, 12 pages.

International Search Report and Written Opinion, International Application No. PCT/US2007/66579, Filed on Apr. 12, 2007, Applicant: T-Mobile, Inc., Date of Mailing Sep. 9, 2008, 9 pages.

International Search Report and Written Opinion, International Application No. PCT/US2007/82136, Applicant: T-Mobile USA, Inc., Flied on Oct. 22, 2007, Date Mailed on Mar. 11, 2008, 11 pages.

Raja, K., et al., "We Know," IEE Communication Engineer, Jun./Jul. 2004, 6 pages.

Spinney, Jonathan, "Wireless Location Uses in the User Plane and Control Plane," The Location Based Services Community, Jun. 27, 2005, 3 pages.

Schulzrinne et al. "Emergency Services for Internet Telephony Systems," Oct. 16, 2004, Network Working Group, Internet Draft, pp. 1-20.

European Patent Office, Extended European Search Report, EP Application 06826444.9, mailed Sep. 12, 2012, 8 pages.

Extended European Search Report, EP Patent Application 07760606.9, mailed Jan. 23, 2013, 8 pages.

U.S. Appl. No. 13/154,365, filed Jun. 6, 2011, Caldwell et al.

International Search Report and Written Opinion, International Application No. PCT/US2010/035010, Applicant: T-Mobile USA, Inc., Flied on May 14, 2010, Date Mailed on Dec. 22, 2010, 10 pages.

International Search Report and Written Opinion, International Application No. PCT/US2010/035014, Applicant: T-Mobile USA, Inc., Flied on May 14, 2010, Date Mailed on Dec. 28, 2010, 11 pages.

Martin-Escalona, et al., "Delivery of Non-Standardized Assistance Data in E-OTD/GNSS Hybrid Location Systems," IEEE 2002, pp. 1-5.

Steinfield, "The Development of Location Based Services in Mobile Commerce," Elife after the dot.com bust, Berlin, Springer, 2004, pp. 1-15.

* cited by examiner

SYSTEM AND METHOD FOR UTILIZING IP-BASED WIRELESS TELECOMMUNICATIONS CLIENT LOCATION DATA

CROSS-REFERENCE TO RELATED APPLICATION(S)

This application is a U.S. National Stage application of International Application No. PCT/US07/82136, entitled SYSTEM AND METHOD FOR UTILIZING IP-BASED WIRELESS TELECOMMUNICATIONS CLIENT LOCATION DATA, filed Oct. 22, 2007, which claims the priority of U.S. Provisional Application No. 60/853,086, entitled METHOD AND DELIVERY OF UMA VALUE ADDED LOCATION SERVICES VIA SUPL, filed Oct. 20, 2006, each of which is hereby incorporated by reference in its entirety.

TECHNICAL FIELD

The present invention is directed generally toward telecommunications and more specifically toward mobile telecommunications devices and services.

BACKGROUND

In this digital age, modern telecommunication service providers and device manufacturers are increasingly relying on public and/or private IP (Internet Protocol) networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), IEEE 802.11 wireless fidelity ("WiFi"), Bluetooth, ZigBee and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (alternatively referred to as Universal Mobile Access (UMA)) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM) networks) and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users may face various obstacles. For example, it can be necessary or desirable to determine the location of a mobile device for various reasons, such as needing to provide it to certain services, such as emergency services that need to know the location of the user of the mobile device. Certain mobile devices have incorporated Global Positioning System (GPS) technology that enables determining their locations. However, GPS technology may not function as desired in certain situations, and other mobile devices may not have incorporated GPS technology. It can still be desirable or necessary to determine the locations of such mobile devices and provide it to certain services.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
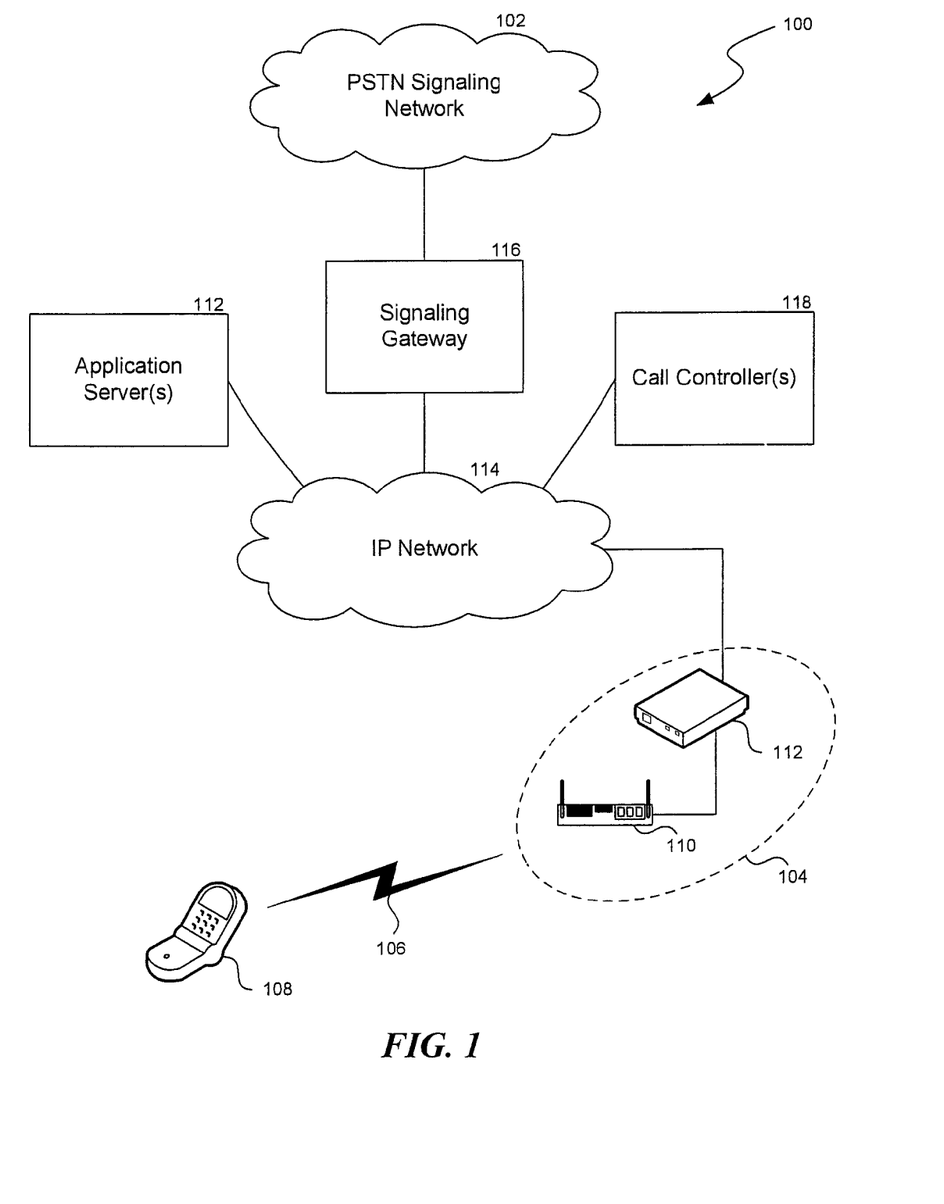
FIG. 1 illustrates aspects of a sample network system that allows VoIP-based communications in conjunction with a public switched telephone network (PSTN).

FIG. 1 and the following discussion provide a brief, general description of suitable environments in which the technology can be implemented. Although not required, aspects of the technology are described in the general context of computer-executable instructions, such as routines executed by a general-purpose computer, e.g., a server computer, wireless device or personal computer. Those skilled in the relevant art will appreciate that the technology can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

1. Sample Network Configurations

Figure 2:
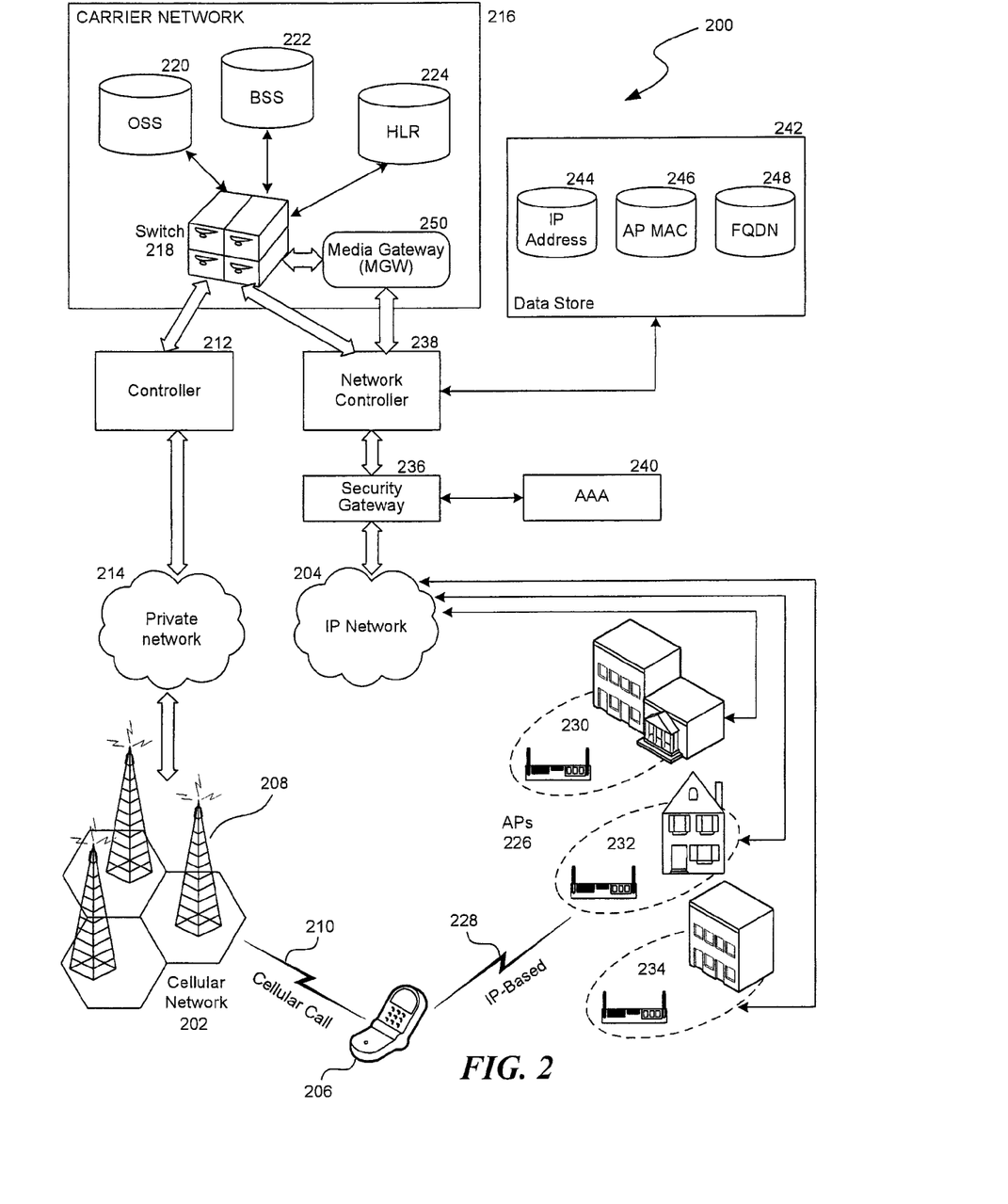
FIG. 2 illustrates an example converged wireless network system that combines a cellular network with an IP-based wireless telecommunications network.
Figure 3:
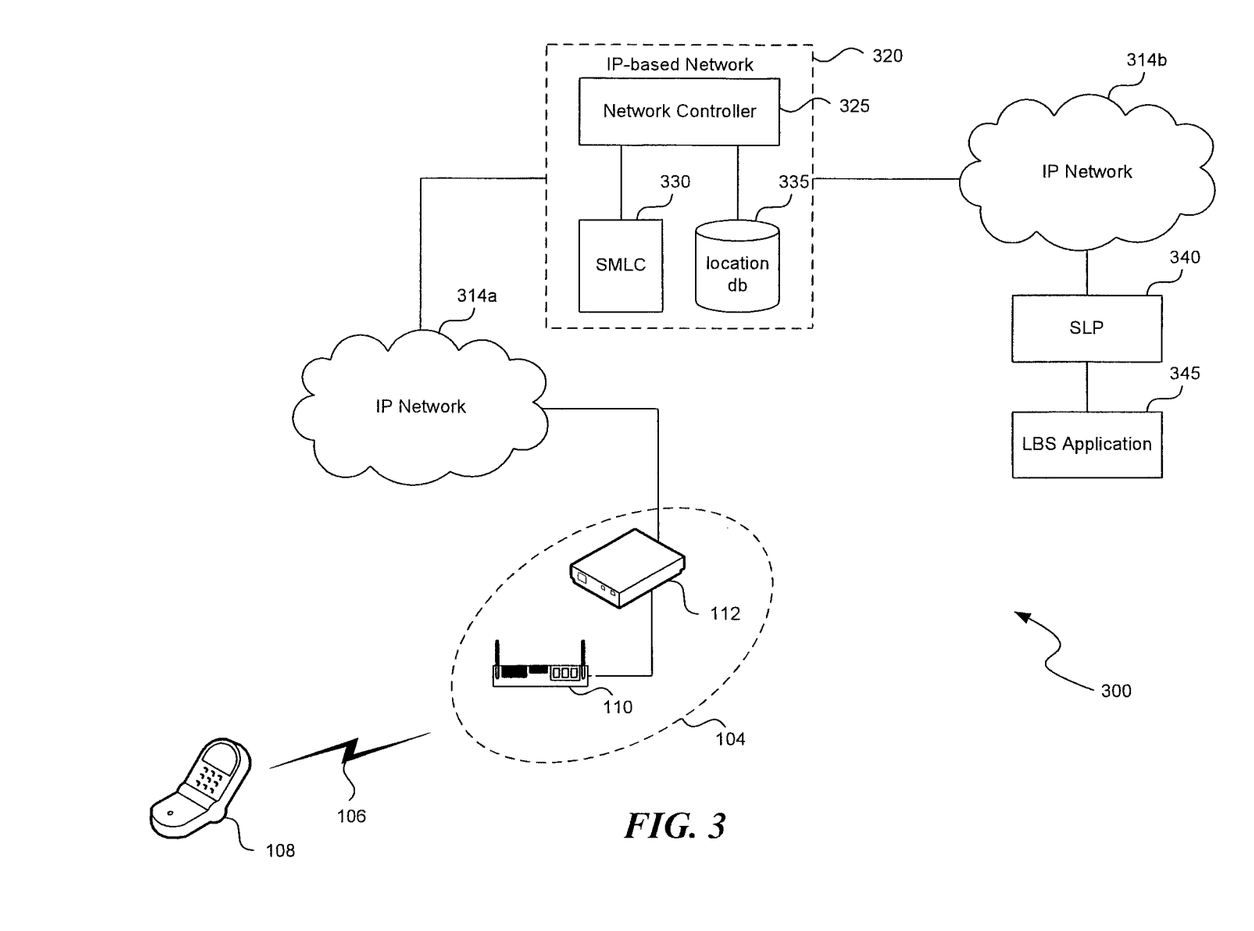
FIG. 3 illustrates a location provision facility in accordance with embodiments of the invention.

FIGS. 1-3 show sample network system configurations in which aspects of a location provision facility can be implemented in accordance with various embodiments. In general, one purpose of the location provision facility is to provide locations of telecommunications devices to certain services.

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), IEEE 802.11 wireless fidelity (Wi-Fi), Bluetooth standards, Zigbee or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In this example, a telecommunication service provider manages both the call controller 118 and the application server 120.

FIG. 2 illustrates a sample network system 200 in which aspects of the location provision facility can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206. Such service may include voice services, and also supplementary services like call forwarding and call waiting, text messaging services (e.g., SMS), and data-based services like ringtone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 242 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 240. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (MI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

FIG. 3 illustrates a suitable environment 300 in which the location provision facility can be implemented. As previously described with reference to, e.g., FIGS. 1 and 2, the access point 104 enables the telecommunications device 108 (e.g., a dual-mode mobile phone that can connect to an existing cellular network and is UMA-enabled) to connect to an IP Network 314a. An IP-based wireless telecommunications network (e.g., UMA or GAN) is also connected to the IP Network 314a. The IP-based telecommunications network 320 can be part of a cellular network. The IP-based telecommunications network 320 includes a network controller (e.g., a UMA Network Controller (UNC), or a GAN Controller (GANC)) 325, which is connected to a serving mobile location center (SMLC) 330 and to a location database 335. The IP-based telecommunications network 320 is also connected to an IP Network 314b. The IP Networks 314a and 314b can be the same IP network, but are shown as distinct networks for illustrative purposes. A Secure User Plane Location (SUPL) Location Platform (SLP) 340 is connected to the IP Network 314b. A Location-Based Services (LBS) application 345 is connected to the SLP 340. Although the SLP 340 and the LBS application 345 are depicted as separate from the IP-based telecommunications network 320, the IP-based telecommunications network 320 can include either or both components. For example, the SLP 340 can be included in the IP-based telecommunications network 320. The SMLC 330 and the location database 335 can also be without the IP-based telecommunications network 320. The interactions between the various components depicted as part of the environment 300 are described with reference to, e.g., FIGS. 4-7.

The location provision facility can be implemented in environments other than the environment 300 depicted. For example, the telecommunications device 108 could be a non-IP-enabled mobile phone (e.g., a non-UMA enabled phone)

that connects to an IP-enabled femtocell (e.g., a UMA-enabled femtocell) that is connected to an IP-based telecommunications network (e.g., a UMA network) over an IP network. As a second example, the telecommunications device 108 could be an analog telephone that connects to a IP-enabled terminal adaptor (e.g., a UMA-enabled terminal adaptor) that is connected to a IP-based telecommunications network (e.g., a UMA network) over an IP network. As a third example, the telecommunications device could be an IP-enabled softmobile (e.g., a personal computer having a USB device with an embedded SIM and UMA softphone application) that is connected to an IP-based telecommunications network (e.g., a UMA network) over an IP network. The telecommunications device may also include other devices, such as wearable computers, devices that perform monitoring or tracking functions, and any other device (or combination of devices) that is IP-enabled (e.g., UMA-enabled), either in hardware, software, or a combination of both hardware and software. Therefore, those of skill in the art will understand that various configurations are possible and that the location provision facility can be implemented in a wide variety of environments.

2. Registering an IP-Based Telecommunications Mobile Device

Figure 4:
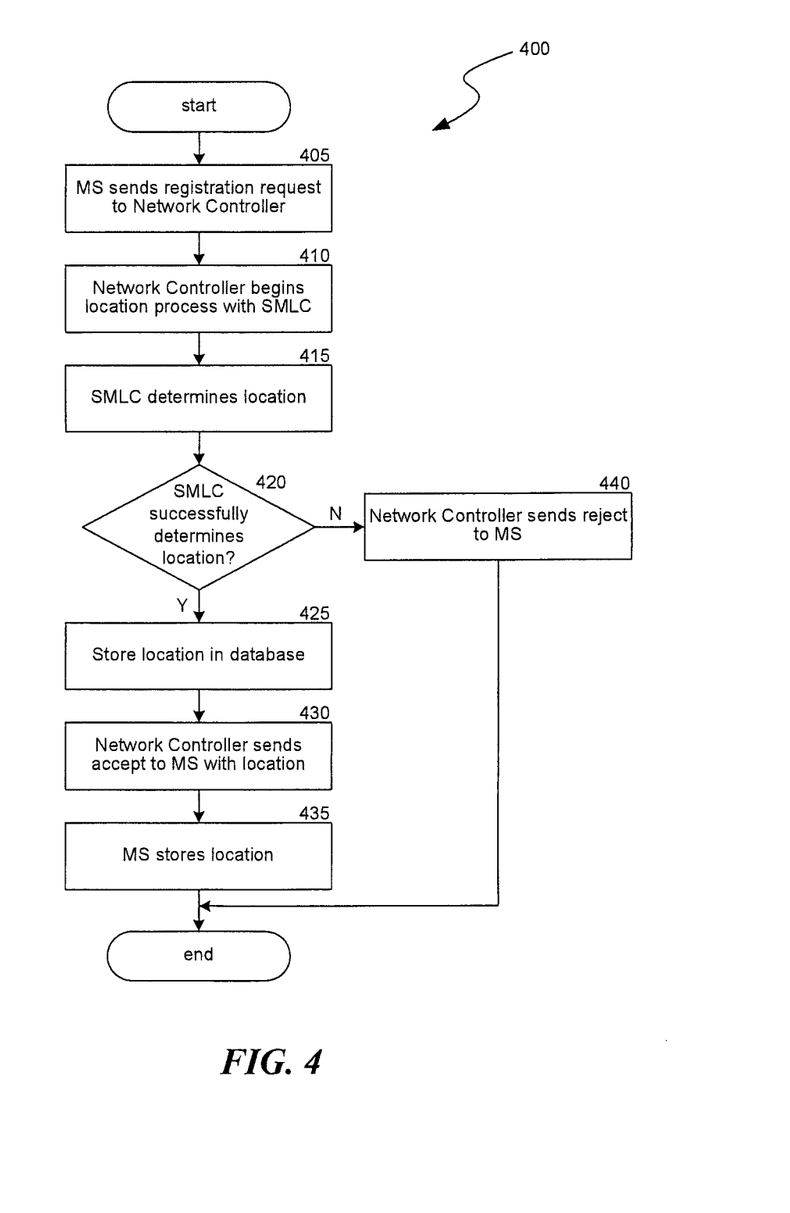
FIG. 4 is a flow diagram of a process for registering an IP-based telecommunications mobile device.

FIG. 4 is a flow diagram of a process 400 for registering an IP-based telecommunications mobile device (mobile station (MS)). An MS refers to any wireless device that can access network services over a radio interface. For purposes of illustration, the process 400 is described below in the context of the environment 300 of FIG. 3. The process 400 begins at block 405 at which an MS sends a registration request (e.g., a URR_Registration_Request) to the network controller 325. The registration request can include data from the MS 108 that enables a determination of its location. At block 410, the network controller 325 begins the location process by initiating a location request to the SMLC 330. In some embodiments, the location process is begun immediately after verifying IP Security (IPSEC) tunnel information with a signaling gateway (SGW) (not shown in FIG. 3). The network controller 325 initiates the location request by sending a Perform Location Request message to the SMLC. The Perform Location Request message may include a Location Services (LCS) Quality of Service (QoS) information element with the Response Time (RT) parameter set to one of the four valid entries (00b to 11b). The network controller 325 can determine the value of the RT parameter based upon a system parameter. In some embodiments the system parameter is named "Registration_PLRQ_RT" and has a default value of 01b, thus setting the RT parameter to 01b ("Low Delay").

The SMLC 330 receives the Perform Location Request from the network controller 325 and at block 415 attempts to determine the location of the MS 108 using location technology algorithms. In some embodiments, the SMLC attempts to determine the location of the MS 108 using methods described in International Application No. PCT/US2007/066579, entitled MOBILE COMPUTING DEVICE GEOGRAPHIC LOCATION DETERMINATION, filed Apr. 12, 2007, the entirety of which is hereby incorporated by reference, and/or the previously-referenced U.S. Provisional Application No. 60/853,086. After attempting to determine the location of the MS 108, the SMLC 330 sends a Perform Location Response message to the network controller 325.

After receiving the Perform Location Response message, at block 420 the network controller 325 verifies whether the SMLC 330 successfully determined the location of the MS 108, by checking to see if the Perform Location Response message includes a location response or location estimate. In some embodiments, the location estimate includes the estimated latitude and longitude of the MS 108. If the Perform Location Response message does not include a location estimate (such as the estimated latitude and longitude of the MS 108), the network controller logs an indication of the mobile device or subscriber identity (e.g., an International Mobile Subscriber Identity WSW of the MS 108, the MAC address of its access point and a timestamp. The process 400 then continues at block 440, at which the network controller 325 sends a registration rejection message (e.g., a URR_Registration_Reject with an error code of "Geo-Location Unknown") to the MS 108. The process 400 then ends.

If the SMLC 330 successfully determined the location of the MS 108 (e.g., if the Perform Location Response message includes a location estimate including an estimated latitude and longitude), the process 400 instead continues at block 425, at which the network controller 325 stores the location (e.g., the estimated latitude and longitude) in the location database 335. The location database 335 can be a Dynamic Host Configuration Protocol (DHCP) server database, a DHCP-like server database, or any standalone database. At block 430 the network controller 325 sends a registration acceptance message (e.g., a URR_Registration_Accept) that includes the location to the MS 108. Alternatively, instead of including the location in the registration acceptance message, the network controller 325 can instead obtain the location from the location database 335 and provide it to the MS 108 using DHCP or a protocol that is generally similar to DHCP. For example, another protocol that can be used is the HTTP Enabled Location Delivery (HELD) protocol. The network controller 325 can provide the location to the MS 108 on a periodic or as-needed basis. For example, as the MS 108 moves, the network controller 325 can provide the MS 108 with updated locations. At block 435 the network controller MS 108 stores the location and a timestamp indicating the date and time of the storage (or of the location determination). The process 400 then ends.

3. Providing Mobile Device Location Information to an LBS Application

Figure 5:
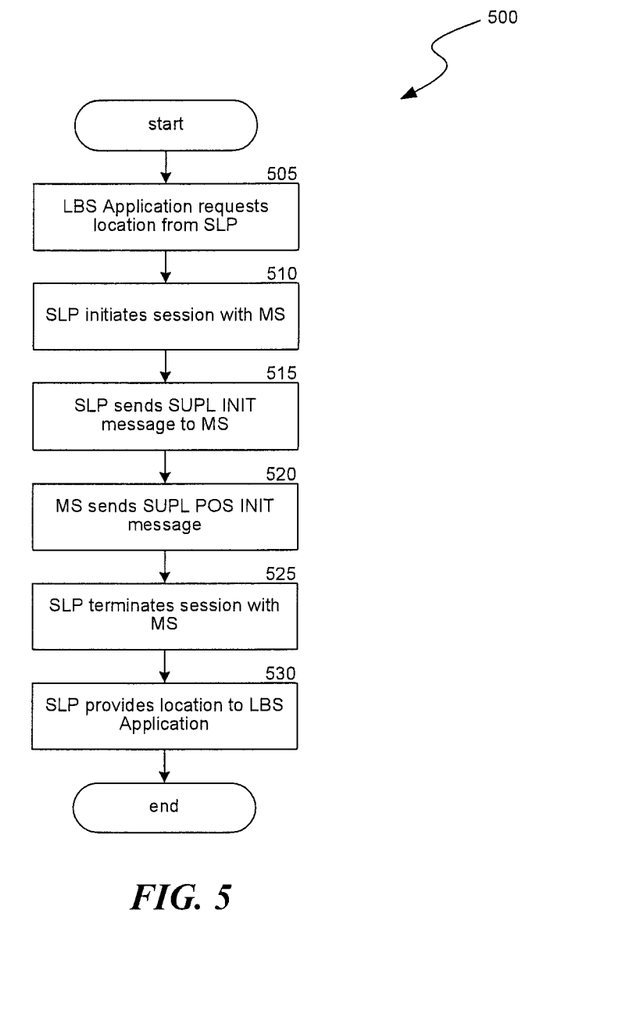
FIG. 5 is a flow diagram of a process for providing location information of an IP-based telecommunications mobile device to a Location-Based Service (LBS) application.

FIG. 5 is a flow diagram of a process 500 for providing location information of an IP-based telecommunications mobile device (MS) to an LBS application or value added client over SUPL. An LBS application generally refers to any application that wishes to obtain the location of the MS 108. Examples of LBS applications include, but are not limited to: a friend finder application; a security application; an emergency services application (e.g., E911); a driving directions application; and an advertising services application. For purposes of illustration, the process 500 is described below in the context of the environment 300 of FIG. 3.

The process 500 begins at block 505, at which the LBS application 345 requests the location of the MS 108 from the SLP 340. As previously noted, the LBS application 345 and the SLP 340 can both be located within the IP-based telecommunications network 320. In some embodiments, however, only the SLP 340 is located within the IP-based telecommunications network 320, in which case the LBS Application 345 connects to it via the IP Network 314b. In other embodiments, the LBS Application 345 is within the IP-based telecommunications network 320 and the SLP 340 is without, and they connect to each other via the IP Network 314b. After receiving the request from the LBS Application 345, at block 510 the SLP 340 initiates a service discovery process and initiates a session with the MS 108. At block 515 the SLP 340 sends to the MS 108 a SUPL INIT message. The SUPL INIT message includes various parameters, such as: 1) Positioning Method, which includes the positioning technology desired by the SLP 340; 2) Notification, which includes instructions to the MS 108 with respect to notification and privacy policies of the LBS application 345; 3) SLP Address, which includes an electronic address of the SLP 340; 4) QoP, which includes the desired Quality of Position (location); 5) SLP Mode, which includes an indication of the proxy mode of the SLP; 6) MAC, which includes a Message Authentication Code (MAC) which may be used as integrity protection of the SUPL INIT message; and 7) Key Identity, which includes a key identity that identifies a key to be used to verify the MAC.

At block 520 the MS 108 responds to the SUPL INIT message by sending a SUPL POS INIT message to the SLP 340. The SUPL POS INIT message includes various parameters, such as: 1) SET capabilities, which includes the capabilities of the MS 108; 2) Requested Assistance Data, which includes requested GPS assistance data; 3) Location ID, which includes the cell information of the MS 108; 4) SUPL-POS, which includes a SUPLPOS message; 5) Ver, which includes a hash of the SUPL INIT message; and 6) Position, which includes the location of the MS 108. In some embodiments, the Position parameter includes the location previously stored by the MS 108 at block 435, as well as the timestamp, a location certainty factor, and/or a location confidence factor, and, if the SMLC hadn't successfully determined the location of the MS 108 (e.g., at block 440 of FIG. 4), the reason for the failure. At block 525 the SLP terminates the session with the MS 108 by sending it a SUPL END message. The SUPL END message includes various parameters, such as: 1) Position, which includes the location result of the MS 108; 2) Status Code, which includes the status of the message; and 3) Ver, which includes a hash of the SUPL INIT message. At block 530 the SLP 340 provides the location of the MS 108 to the LBS application 345. The process 500 then ends.

Although described with respect to providing the location of the MS 108 to the LBS application 345 over SUPL, the process 500 can be used to provide the location of any device capable of communicating over a SUPL network to any other device that is also capable of communicating over a SUPL network. Such a device is called a SUPL Enabled Terminal (SET). Examples of SETs include the previously-mentioned MS 108 and the LBS application 345, user equipment (UE) in a Universal Mobile Telecommunications System (UMTS), and a personal computer (PC) over an IP-based network.

4. Mobile Device Registration

Figure 6:
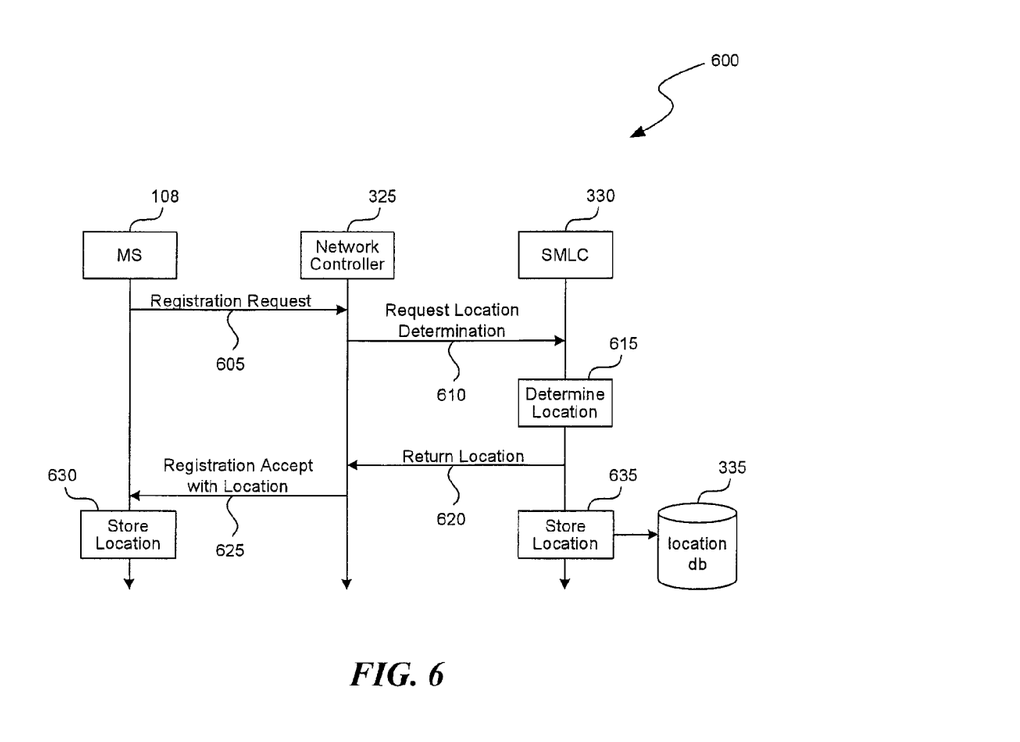
FIG. 6 is a call flow diagram depicting registration of an IP-based telecommunications mobile device.

FIG. 6 is a call flow diagram 600 depicting the registration of an IP-based telecommunications mobile device (MS). At 605 the MS 108 sends a registration request message to the network controller 325. At 610 the network controller 325 requests a location determination from the SMLC 330. At 615 the SMLC 330 determines the location of the MS 108. At 620 the SMLC 330 returns the location to the network controller 325. At 625 the network controller 325 sends a registration acceptance message with the location to the MS 108. At 630 the MS 108 stores the location. At 635 the SMLC 330 stores the location in the location database 335. At 635 the SMLC 330 (or the network controller 325 or another component, not shown) can also create a mapping between the location and the MAC address of the access point of the MS 108 and store this mapping in the location database 335.

5. Provision of Location Information to LBS Applications

Figure 7:
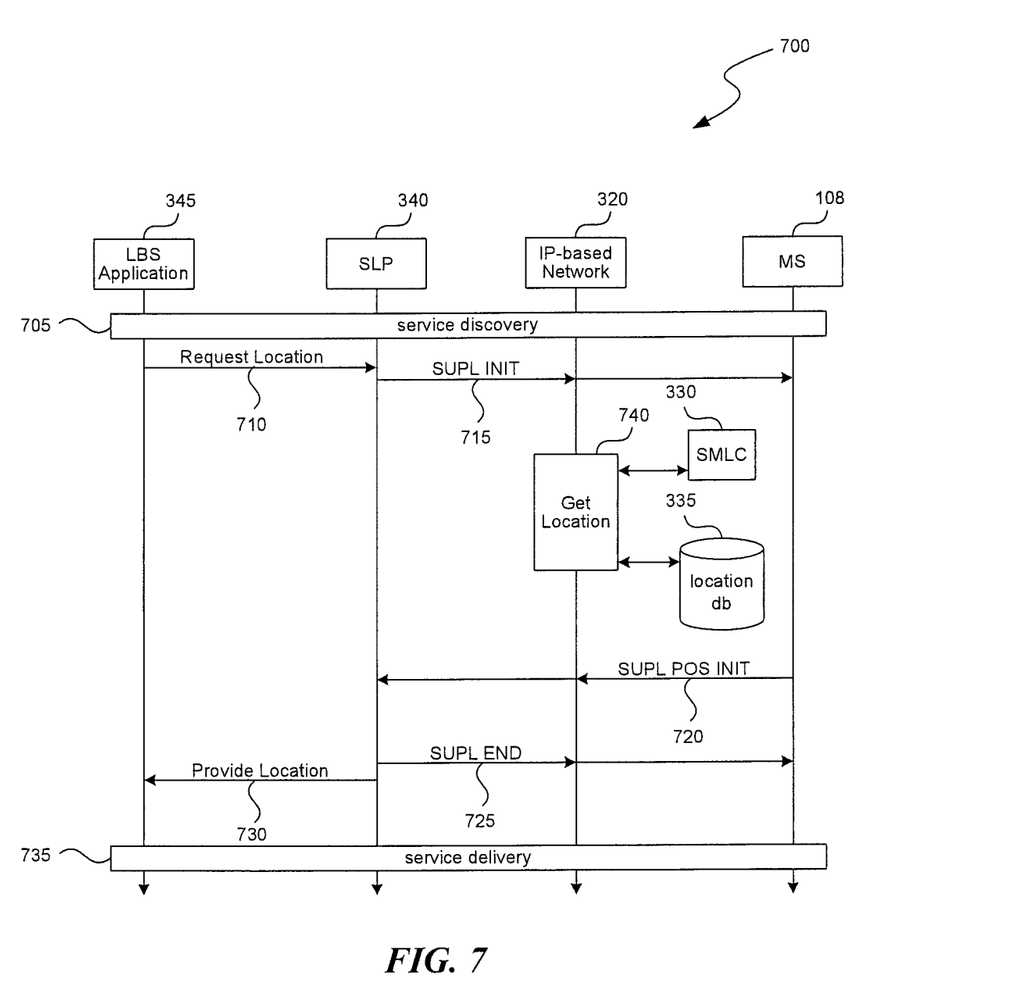
FIG. 7 is a call flow diagram depicting provisioning of location information of an IP-based telecommunications mobile device to an LBS application.

FIG. 7 is a call flow diagram 700 depicting the provision of location information of an IP-based telecommunications mobile device (MS) to an LBS application. At 705 a service discovery process is initiated. At 710 the LBS application 345 requests that the SLP 340 provide a location of the MS 108. At 715 the SLP 340 sends a SUPL INIT message to the MS 108 through the IP-based telecommunications network 320. At 720 the MS 108 sends a SUPL POS INIT message to the SLP 340 through the IP-based telecommunications network 320. At 725 the SLP 340 sends a SUPL END message to the MS 108 through the IP-based telecommunications network 320. At 730 the SLP 340 provides the location to the LBS application 345. At 735 a service delivery process is initiated. The service delivery process can include delivering services from the LBS application 345 to the MS 108. Examples of services include security services, emergency services, advertisements, locating services, directions, etc.

In some embodiments, as an alternative to or in addition to sending the SUPL INIT message to the MS 108, the IP-based telecommunications network 320 (e.g., a component thereof) can get the location of the MS 108 by retrieving it from the location database 335. The SUPL INIT message can include a QoP parameter which includes the quality of location of the MS 108 desired by the LBS application 345. If the QoP parameter indicates a desired or acceptable low quality of location (e.g., a coarse location), at 740 the IP-based telecommunications network 320 can get the stored location of the MS 108 from the location database 335 and provide it to the SLP 340, which in turn provides it to the LBS application 345. The IP-based telecommunications network 320 can thus avoid sending the SUPL INIT message to the MS 108. For example, if the LBS application 345 provides weather information, it may only need to determine the location of the MS 108 within several miles, and thus the LBS application 345 can specify a desired lower quality of location. If the desired quality of location is low, the IP-based telecommunications network 320 may be able to satisfy it by retrieving the location of the MS 108 from the location database 335 and providing the retrieved location to the LBS app 345. Alternatively, the IP-based telecommunications network 320 can send the SUPL INIT message to the MS 108 and receive the SUPL POS INIT message, which includes the position parameter, which includes the location certainty factor and/or the location confidence factor. These factors can be used in determining whether the desired QoP is met.

If instead the QoP parameter indicates a desired high quality of location (e.g., a fine location), the IP-based telecommunications network 320 can request the SMLC 330 (or other system) determine the location of the MS 108 using data from the MS 108 that enables a determination of the location. This enables the IP-based telecommunications network 320 to provide the SLP 340 and the LBS application 345 with a potentially more accurate location of the MS, instead of sending on the location previously-stored by the MS 108 or location database 335, which may not be suitable for a desired high quality of location. For example, if the LBS application 345 provides advertisements, it may need to determine the location of the MS 108 within a very narrow range (e.g., within or adjacent to a retail location), and thus the LBS application 345 can specify a desired high quality of location. The desired high quality of location can require the IP-based telecommunications network 320 to obtain fresher data from the MS 108 that enables a more precise determination of its location. A more precise location can be determined using Global Navigation Satellite System (GNSS), GPS, network-assisted GPS (A-GPS), network measurements, triangulation methods, or any combination of these and/or other location techniques. The more precise location can then be stored in the location database 335, to potentially satisfy future location requests.

The provision of location information of the MS 108 to the LBS application 345 described with reference to FIG. 7 is performed over a user plane (e.g., SUPL, CDMA user plane, etc.). One advantage of performing the provision of location information over a user plane is that a user plane enables the abstraction of many of the underlying network components below the IP layer. This allows an LBS application to communicate with a MS over an all-IP or generally all-IP connection, which can facilitate requesting and providing location-based services. The Open Mobile Alliance (OMA) is another example of a user plane that provides an abstraction above all protocol layers below the IP layer. Thus, the physical and data link layers of a control plane may be ignored, which facilitates creation and delivery of location-based services.

However, the provision of location information of the MS 108 to the LBS application 345 can also be used over a control plane (e.g., CDMA control plane, WCDMA control plane, GSM/3GPP control plane, etc.), which generally use the circuit-switched wireless signaling layer (e.g., SS7). Those of skill in the art will therefore understand that the provision of location information of the MS 108 to the LBS application 345 can be used over both user plane and control plane architectures.

6. Conclusion

As described above, the location provision facility includes many features. For example, it provides services to LBS applications within an IP-based telecommunications architecture. The facility also allows for providing location data to an LBS application over a network employing a user plane such as SUPL. The facility can store location data both in a database associated with an IP-based telecommunications network as well as on the MS. This allows the facility to satisfy requests for location of the MS by retrieving stored location data from the MS, from the database, or from both. When the facility receives a request for more detailed or accurate location data, the facility can calculate a more detailed or accurate location of a MS based upon the request. Location data stored in the database and the MS can be used for LBS applications as well as for other purposes. The facility also provides for other features and advantages.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes, messages or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, messages or blocks may be implemented in a variety of different ways. Also, while processes, messages or blocks are at times shown as being performed in series, these processes or blocks may instead be performed in parallel, or may be performed at different times. Further any specific numbers noted herein are only examples; alternative implementations may employ differing values or ranges.

The teachings of the methods and system provided herein can be applied to other systems, not necessarily the system described above. The elements and acts of the various embodiments described above can be combined to provide further embodiments. Some network elements are described herein as performing certain functions. Those functions could be performed by other elements in the same or differing networks, which could reduce the number of network elements. Alternatively or additionally, network elements performing those functions could be replaced by two or more elements to perform portions of those functions.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

I claim:

1. A method for provisioning location information of wireless handheld devices communicating via a wireless local area computer networks (WLAN) for location-based services the method comprising:

receiving a registration request from a wireless handheld device at a server computer,
wherein the handheld device is capable of communicating over both a cellular phone network under a wireless protocol and an internet protocol (IP)-based WLAN under a WLAN protocol, wherein the IP-based WLAN protocol differs from the wireless protocol for the cellular phone network,
wherein the wireless protocol for the cellular phone network includes multiple layers in a protocol stack, including an IP layer,
wherein the IP-based WLAN includes at least one wireless access point for communicating with the wireless handheld device under a known IP-based WLAN protocol, and
wherein the registration request is received for communication over the WLAN;
obtaining location information regarding a geographic location of the wireless handheld device,
wherein the location information includes at least one location parameter defined by a location-based service application;
registering the handheld device for communication over the WLAN,
wherein the registering includes storing the location information of the handheld device on at least one storage element;
providing the location information to a location-based service provider in response to a first location request from the location-based service provider if the location information satisfies the at least one location parameter,
wherein the location information is provided over a user plane,
wherein the user plane employs an abstraction platform configured to deliver services over the cellular phone network, and
wherein the abstraction platform permits the location-based service provider to program applications that deliver services over the cellular phone network by ignoring protocol stack layers below the IP layer; and
obtaining updated location information in response to a second location request, wherein the second location request is received when the at least one location parameter is not satisfied by the location information received in response to the first location request.

2. The method of claim 1 wherein the wireless handheld devices employs at least a portion of an Unlicensed Mobile Access (UMA) protocol to communicate with the WLAN, and wherein providing the location information over the user plane comprises providing the location information over Secure User Plane Location (SUPL).

3. The method of claim 1 wherein the registering further includes:
determining whether the locally stored location satisfies the at least one location parameter at the handheld device; and,
providing the location information to the location-based service provider if the location information satisfies the at least one location parameter.

4. The method of claim 1 wherein the location information is provided to the handheld device for local storage.

5. The method of claim 1 wherein the storing comprises storing the location information of the handheld device in a database coupled to the server computer.

6. The method of claim 1, wherein registering further comprises obtaining an electronic address associated with an access point of a WLAN;
associating the location information regarding the geographic location of the handheld device with the electronic address; and storing the associated information on the database coupled to the server computer.

7. The method of claim 1 wherein the obtaining location information, obtaining an electronic address, storing the location information, associating and providing are performed on the handheld device.

8. The method of claim 1, further comprising receiving a location-based service at the handheld device directly from the location-based service provider over the WLAN via the abstraction platform.

9. A system for providing location-based services to a mobile device, comprising:
means for communicating with the mobile device based on a Generic Access Network (GAN) protocol;
means for obtaining location information associated with a physical location of the mobile device,
wherein the location information includes at least one location parameter defined by a location-based service application;
means for providing the location information regarding the physical location of the mobile device to a location-based services provider in response to a first location request from the location-based services application,
wherein the location information is provided to the location-based service provider over a user plane including an abstraction platform, and
wherein the abstraction platform permits the location-based service provider to program applications that deliver services over a cellular phone network by ignoring protocol stack layers below an IP layer;
means for receiving content for at least one service from the location-based service application if the location information satisfies the at least one location parameter; and
means for obtaining updated location information associated with the physical location of the mobile device in response to a second location request,
wherein the second request is generated when the at least one location parameter is not satisfied by the location information received in response to the first location request.

10. The system of claim 9, further comprising means for storing the location information of the mobile device.

11. The system of claim 9 wherein the user plane includes Secure User Plane Location (SUPL).

12. The system of claim 9 wherein the physical location of the mobile device is provided to the location-based services provider over a control plane.

13. A non-transitory computer-readable medium encoded with a computer program for providing location-based services to a mobile telecommunications device, the computer program including instructions to perform a method comprising:
obtaining location information associated with a geographic location of the mobile telecommunications device,
wherein the mobile telecommunications device is configured for voice communications over a cellular network and for communications over an IP-based network;
storing the location information during registration of the mobile communication device for communications over the IP-based network;
providing the location information to a location-based service provider in response to a first location request from the location-based service provider over Secure User Plane Location (SUPL), wherein the first location request includes at least one location parameter defined by a location-based service application, and wherein the SUPL employs an abstraction platform configured to permit the location-based service provider to program applications that deliver services over the cellular phone network by ignoring protocol stacks layers below the IP layer; and receiving updated location information in response to a second location request, wherein the second location request is generated if the at least one location parameter is not satisfied by the location information received in response to the first location request.

14. A computer-implemented method associated with provided location-based services in a mobile telecommunications network, the method comprising:

obtaining location information associated with geographic locations of a mobile telecommunications device operating within the mobile telecommunications network, wherein the mobile telecommunications network includes a cellular network, wherein the mobile telecommunications device is configured for voice communications over the cellular network, and wherein the mobile telecommunications device is configured for voice communications over Internet Protocol (IP)-based wireless local area networks (WLANs);

registering the mobile communications device for voice communications over one or more IP-based WLANs;

storing the location information associated with a geographic location of the mobile telecommunications device;

providing the location information regarding the geographical location of the mobile telecommunications device in response to a first location request received from the location-based service provider, wherein the first location request includes at least one location parameter defined by a location-based service application, and wherein the location information is provided over a user plane employing an abstraction platform configured to permit the location-based service provider to program applications that deliver location-based services over the cellular phone network; and receiving updated location information associated with the geographic location of the mobile telecommunications device in response to a second location request, wherein the second location request is generated when the at least one location parameter is not satisfied by the location information received in response to the first location request, and wherein the updated location information is provided to the location-based service provider in response to the second location request if the at least one location parameter is satisfied.

15. The method of claim 14 wherein the mobile telecommunications devices employ an Unlicensed Mobile Access (UMA) protocol.

16. The method of claim 14, wherein the location information is further updated as the mobile telecommunications devices move about the cellular and wireless local area networks, wherein the updating is performed in a Dynamic Host Configuration Protocol (DHCP)-like manner.

17. A computer-implemented method for providing location information of wireless handsets operating within an I.P.-based telecommunications network, the system comprising:

receiving location information associated with a geographic location of a wireless handset communicating over an IP-based network, wherein the location information is received in response to a first location request from a location based service provider, and wherein the location request includes at least one location parameter defined by a location-based service application;

determining if the received location information satisfies the at least one location parameter;

providing the location information of the wireless handset to the location based service provider if the at least one location parameter is satisfied, wherein the location information associated with the geographic location of the wireless handset is stored in a storage medium; and receiving updated location information associated with the geographic location of the wireless handset, wherein the updated location information is received in response to a second location request generated when the at least one location parameter is not satisfied, and wherein the updated location information is higher quality than the location information received in response to the first location request.

18. The method of claim 17, further comprising:

obtaining location information associated with geographic locations of multiple wireless handsets operating within the telecommunications network; and, storing the location information in a location database.

19. The method of claim 17 wherein the higher quality updated location information comprises a more accurate geographic location of the wireless handset.

20. The method of claim 17 wherein the server computer is further configured to provide location information and/or updated location information associated with the geographic location of the wireless handset to the one wireless handset for local storage.

21. The method of claim 20 wherein the information is provided to the wireless handset in a Dynamic Host Configuration Protocol (DHCP) or similar protocol.

22. The method of claim 1, wherein the location parameter includes a location certainty factor and/or a location confidence factor, and wherien one or more of the location certainty factor or the location confidence factor is utilized in determining whether the location parameter is satisfied.

23. The method of claim 1, further comprising: providing the updated location information to the location-based service provider in response if the updated location information satisfies the at least one location parameter.

24. The system of claim 9, wherein the updated location information is higher quality than the location information received in response to the first location request.

25. The computer-implemented method of claim 17, wherein the at least one location parameter includes a location certainty factor and/or a location confidence factor, and wherein one or more of the location certainty factor or the location confidence factor is utilized in determining whether the at least one location parameter is satisfied.

* * * * *